Fig. 2

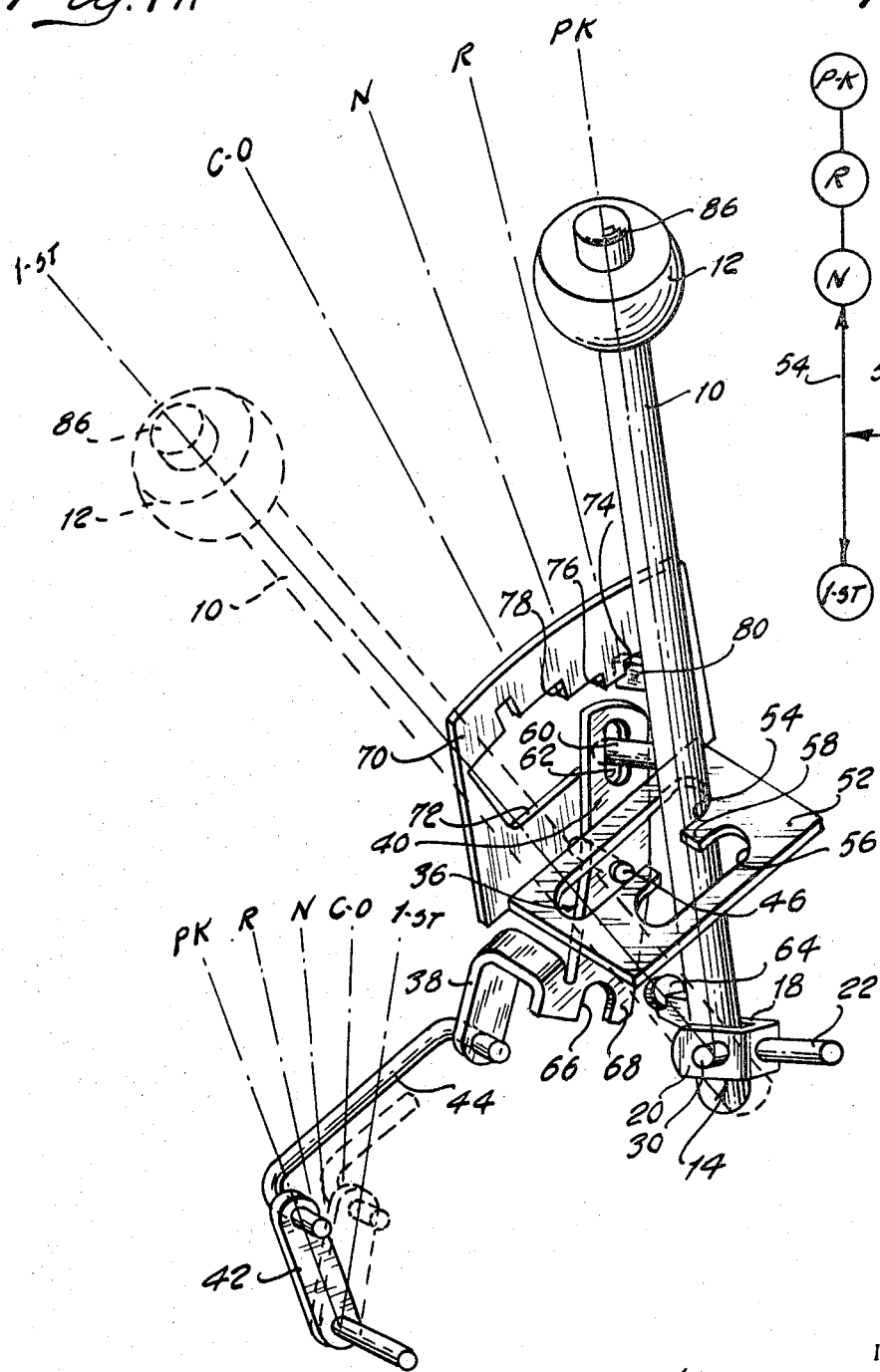
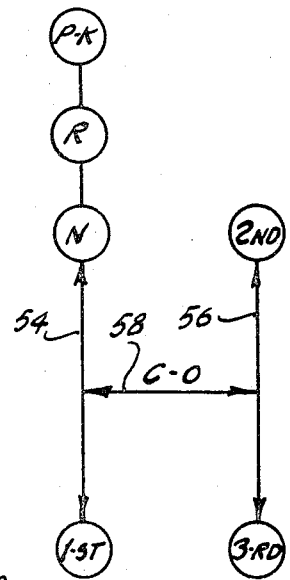

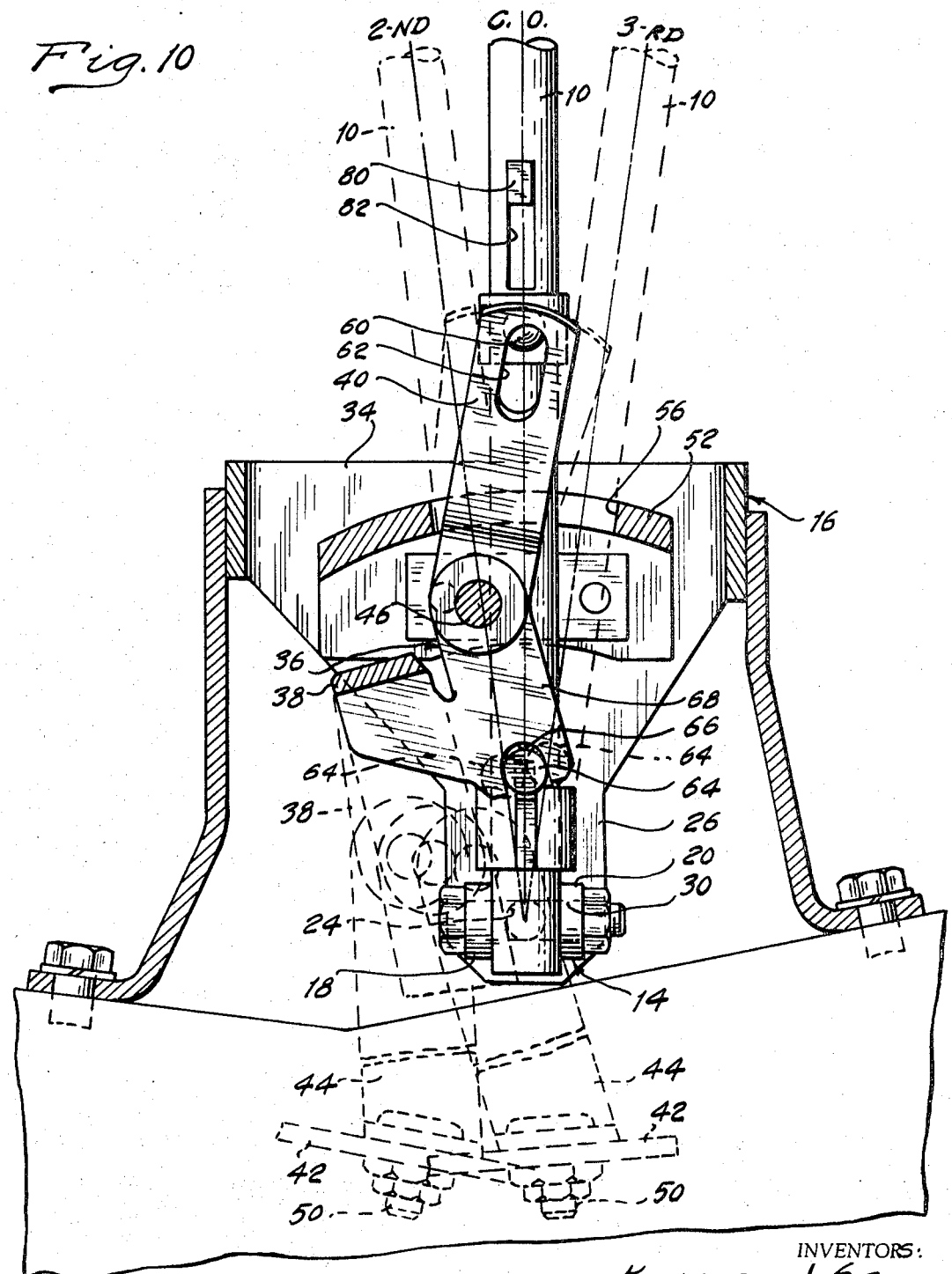

United States Patent Office 3,465,612
Patented Sept. 9, 1969

3,465,612
REMOTE CONTROL LINKAGE MECHANISM FOR A MULTIPLE RATIO POWER TRANSMISSION SYSTEM
Bruce K. Letwin, Trenton, and Kenneth J. Sroka, Garden City, Mich., assignors to Ford Motor Company, Dearborn, Mich., a corporation of Delaware
Filed Mar. 8, 1968, Ser. No. 711,549
Int. Cl. G05g 9/06
U.S. Cl. 74—473                                   6 Claims

ABSTRACT OF THE DISCLOSURE

A driver operated transmission ratio selector in an automotive vehicle driveline, including a control lever mounted for movement in an H shift pattern as any one of three forward drive transmission drive ranges or a single reverse drive range is selected. The control lever carries two pawls each of which is selectively engageable with a shift lever operatively connected to the transmission manual valve lever.

GENERAL DESCRIPTION OF THE INVENTION

Our invention relates generally to torque delivery drivelines for a wheeled, automotive vehicle, and more particularly to a manually-operated linkage mechanism for conditioning a driveline for operation in various drive ranges, each of which has a separate speed ratio.

The improved remote control mechanism of our invention is adapted especially to be used with an automatic power transmission system of the type disclosed in U.S. Patent No. 3,295,387 which is assigned to the assignee of our invention. Our automatic power transmission system includes planetary gearing and control clutches and brakes for conditioning the gearing for operation in any one of three forward driving ratios and a single reverse ratio. In a first drive range the transmission system is capable of shifting automatically during acceleration of the vehicle from a low speed ratio to an intermediate speed ratio and finally to a high speed ratio.

Ratio shifts between the ratios occur in response to changes in an engine torque signal and in a vehicle speed signal. A second drive range can be obtained by shifting the manual valve in the automatic control valve body from a fully automatic drive range position to a so-called intermediate position, which will condition the gearing for continuous operation in an intermediate speed ratio. At that time the influence of the engine torque signal and the vehicle speed signal is overruled, and ratio shifts to either the high ratio of the low ratio are inhibited.

When the manual valve is shifted to a third drive range position, the transmission mechanism is conditioned for continuous operation in the low speed ratio, and no automatic upshifts can be achieved.

Reverse drive operation is obtained as the operator shifts the manual valve to a so-called reverse position which is located on one side of a neutral position, the previously described forward drive range positions being located on the other side of the neutral position.

In a transmission control of this type the operator can select either a fully automatic drive range or a semi-automatic drive range. If the automatic drive range is selected, the transmission will operate in the usual fashion in response to changes in the control signals to provide optimum performance for any given road-load condition. This automatic shifting sequence can be interrupted or overruled, however, as the operator shifts manually the manual valve to the low range position, and then to the intermediate range position, and finally to the high range position, the latter corresponding to the fully automatic drive range.

In our improved control mechanism we have provided a driver-operated control lever in the passenger compartment of the vehicle. We have mounted it pivotally on the transmission housing so that it can extend through the floor structure of the vehicle. By appropriately positioning the control lever, the operator can choose any drive range that he desires as he maneuvers the vehicle.

The control lever can be moved in a so-called H shift-pattern. That is, the control lever can be moved in either of two shift planes as the operator shifts it fore-and-aft with respect to the centerline of the vehicle. The reverse, neutral and first drive range positions are selected as the control lever is shifted in a first plane, and the intermediate, neutral and high ratio positions are selected as the operator shifts the control lever in a second plane. Movement of the control lever from one plane to the other occurs at a crossover point that is situated between the intermediate speed ratio position and the high speed ratio position.

As the operator adjusts the control lever in this fashion, the lever engages positive stops upon assuming each of the various drive range positions. Inadvertent shifting movement of the control lever past the position corresponding to the desired drive range then is avoided. This provides a more reliable transmission ratio control and simplifies ratio selection by the operator during operation of the vehicle.

Any one of several semi-automatic drive range positions or a fully automatic drive range position is selected by appropriately shifting the manual control lever. The H shift pattern that is followed avoids the possibility of overriding the various selected drive range positions.

Simple mechanical linkage elements transfer the motion pattern of the control lever to a manual control valve in the automatic transmission valve circuit.

BRIEF DESCRIPTION OF THE FIGURES OF THE DRAWINGS

FIGURE 1A shows in isometric form our remote control linkage with the control lever in the "park" position.
FIGURE 1B is a diagram illustrating the motion pattern of the shift control lever of FIGURE 1A.
FIGURE 2 is a view similar to FIGURE 1A with the control lever in the third or automatic drive range position.
FIGURE 8 is a cross sectional view as seen from the plane of section line 8—8 of FIGURE 7.
FIGURE 9 is a cross sectional view taken along the plane of section line 9—9 of FIGURE 7.
FIGURE 10 is a cross sectional view taken along the plane of section line 10—10 of FIGURE 7.

PARTICULAR DESCRIPTION OF THE INVENTION

Figure 2:
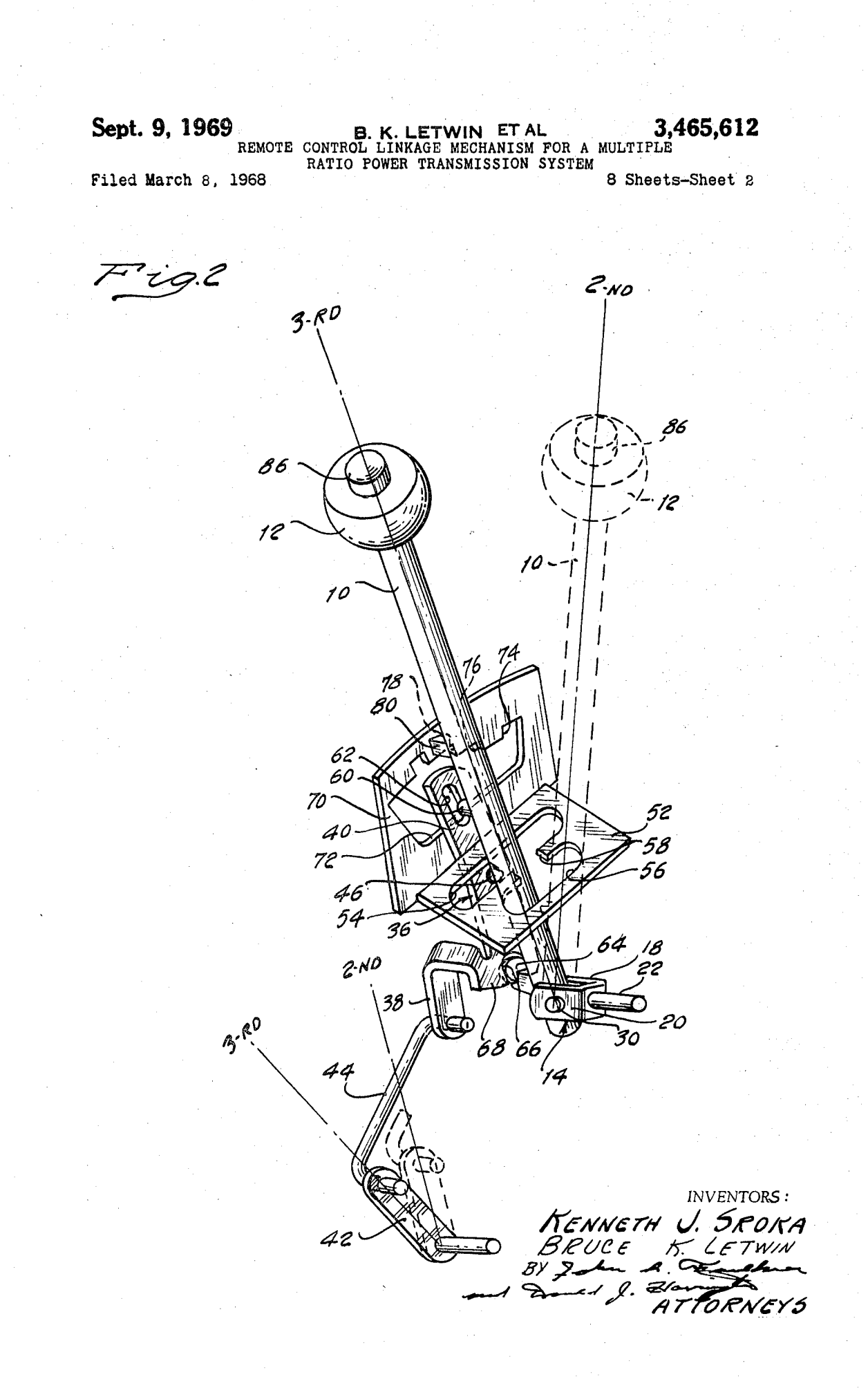

In FIGURES 1 and 2 numeral 10 designates a transmission control lever, hereinafter referred to as a shift lever, having at its upper extremity a grip 12 which can be handled by the vehicle operator.

Figure 3:
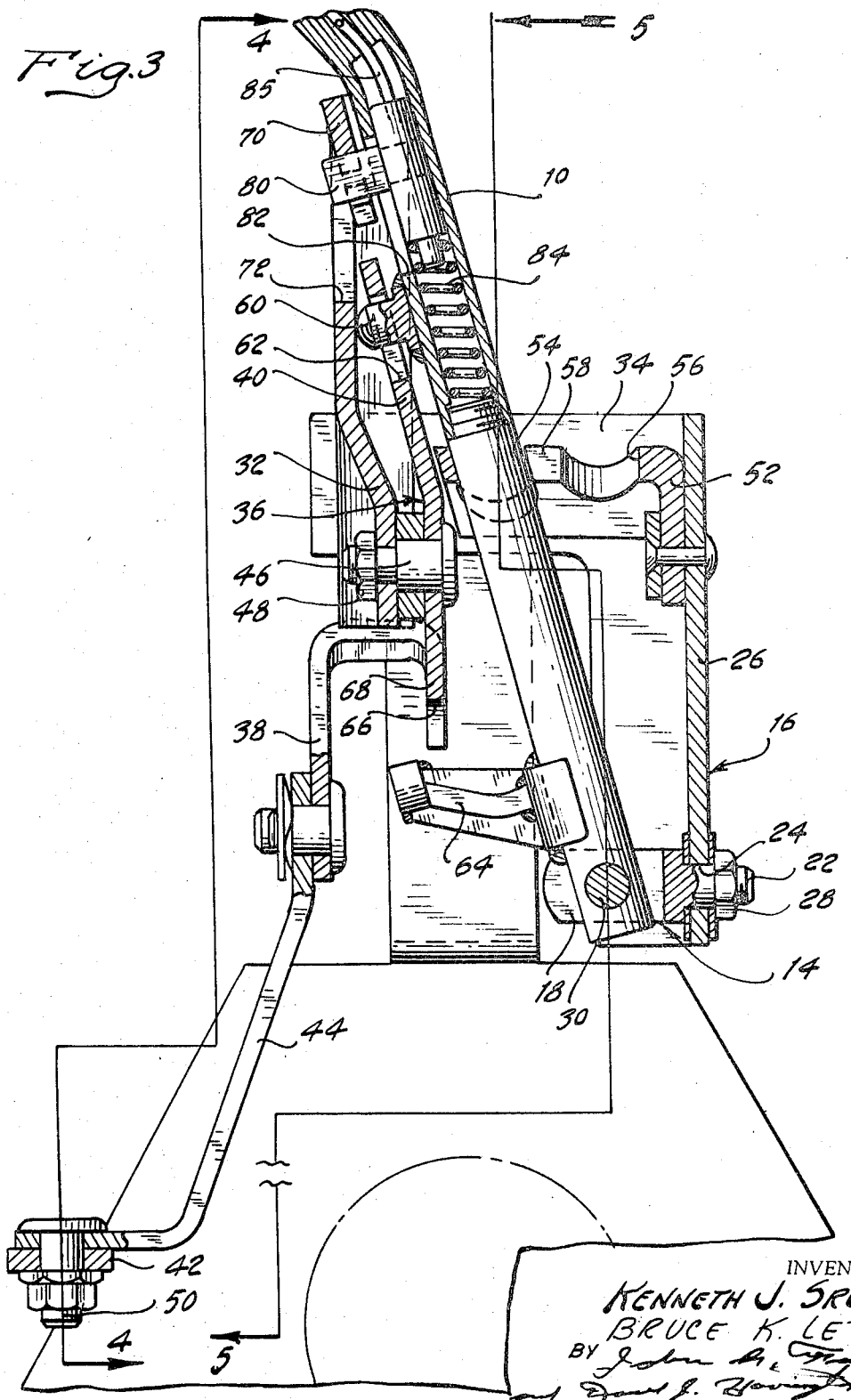
FIGURE 3 is a partial sectional view taken along the plane of section line 3—3 of FIGURES 4 and 5.
Figure 4:
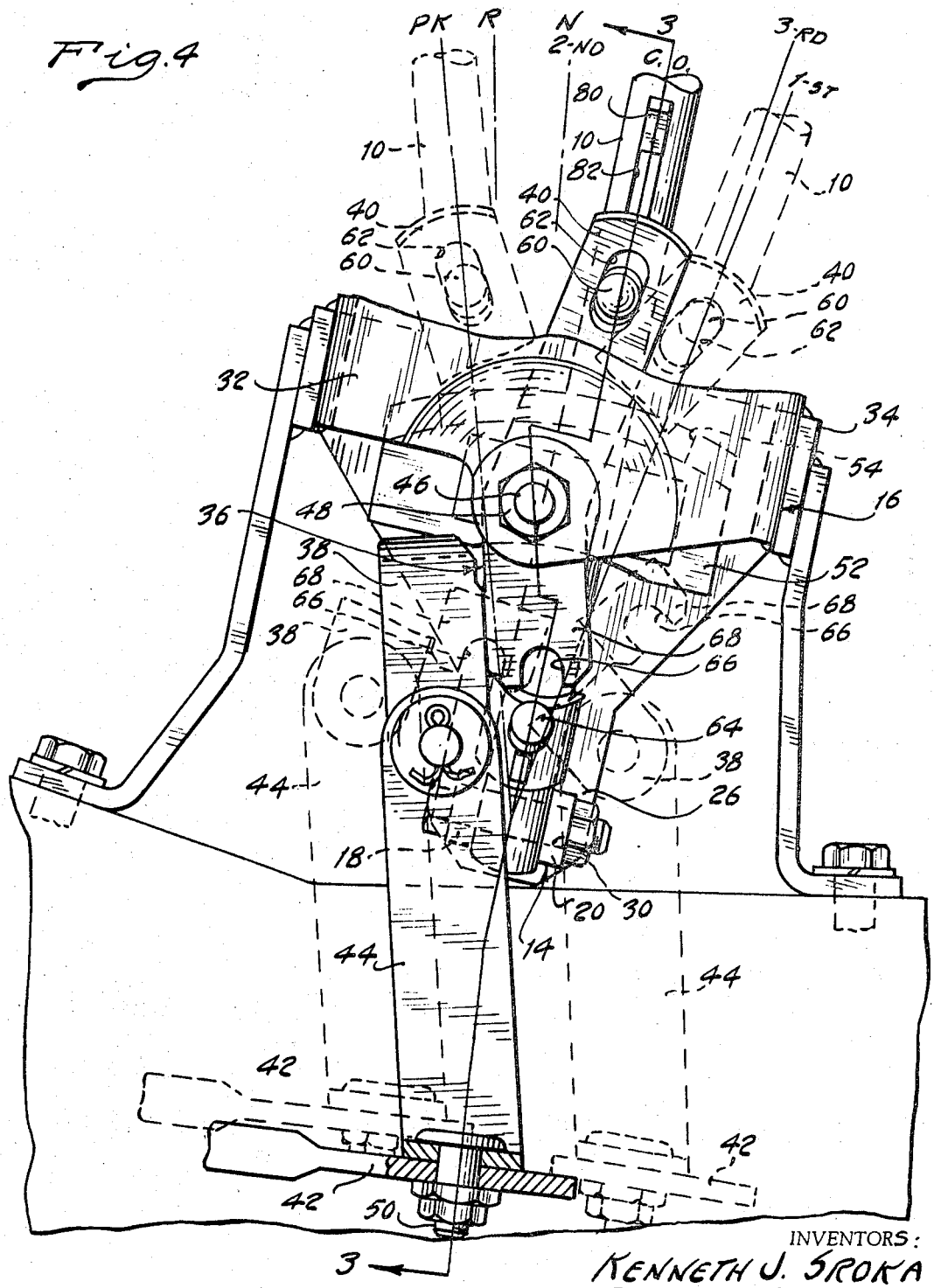
FIGURE 4 is a side elevation view taken along the plane of section line 4—4 of FIGURE 3.
Figure 5:
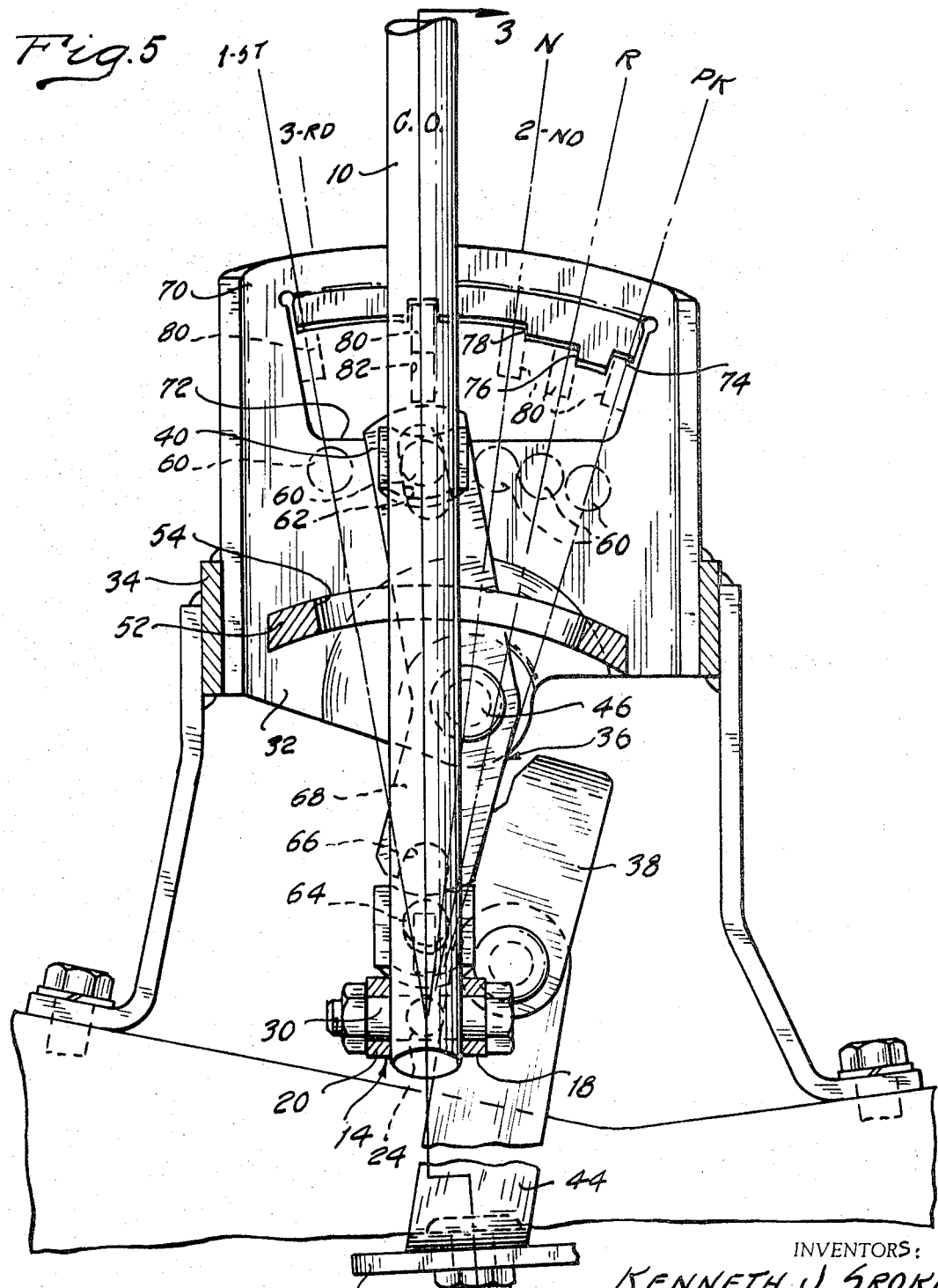
FIGURE 5 is a side elevation view taken along the plane of section line 5—5 of FIGURE 3.
Figure 6:
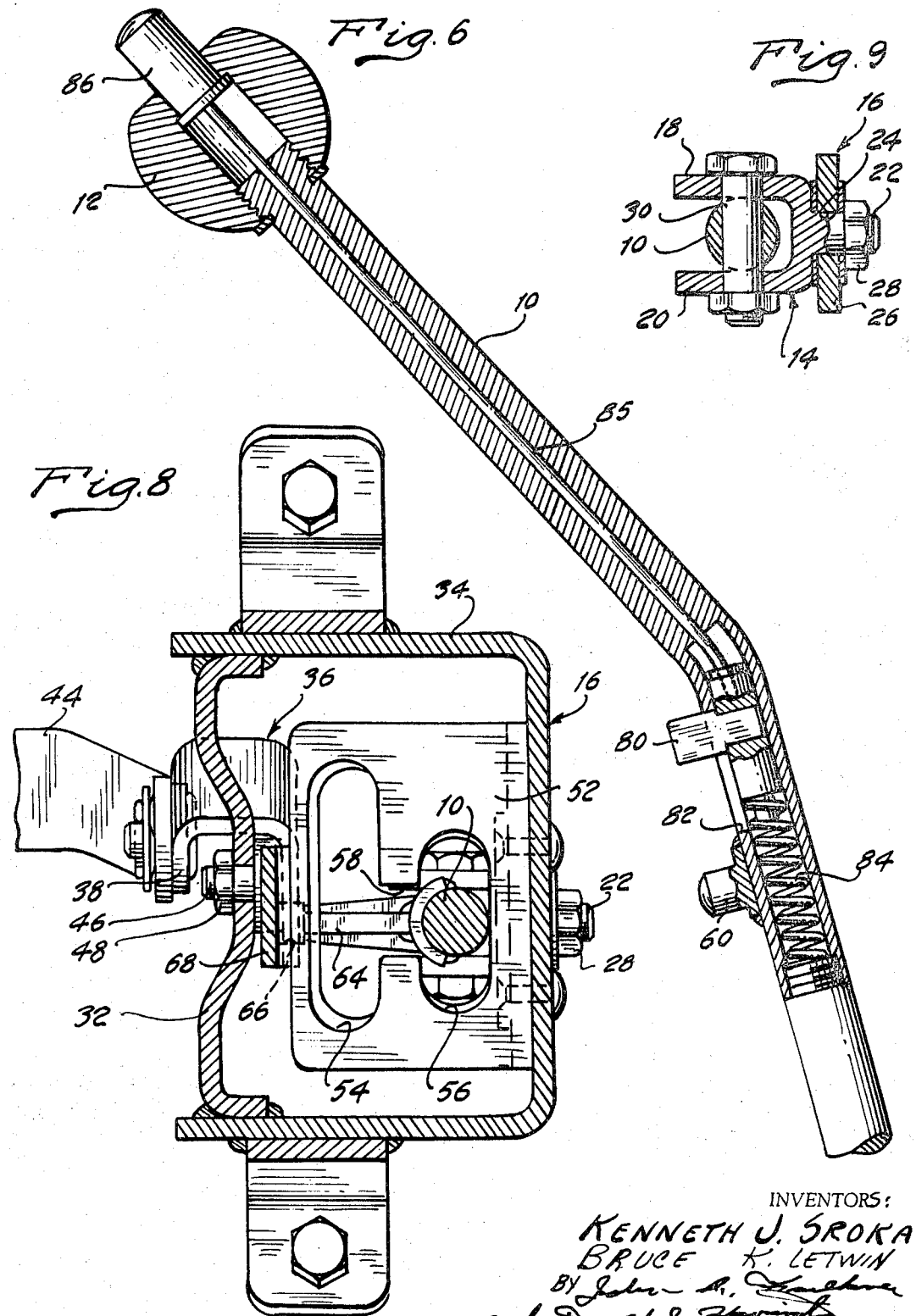
FIGURE 6 is a sub-assembly view, partly in section, showing the control lever of FIGURES 1A and 2.
Figure 7:
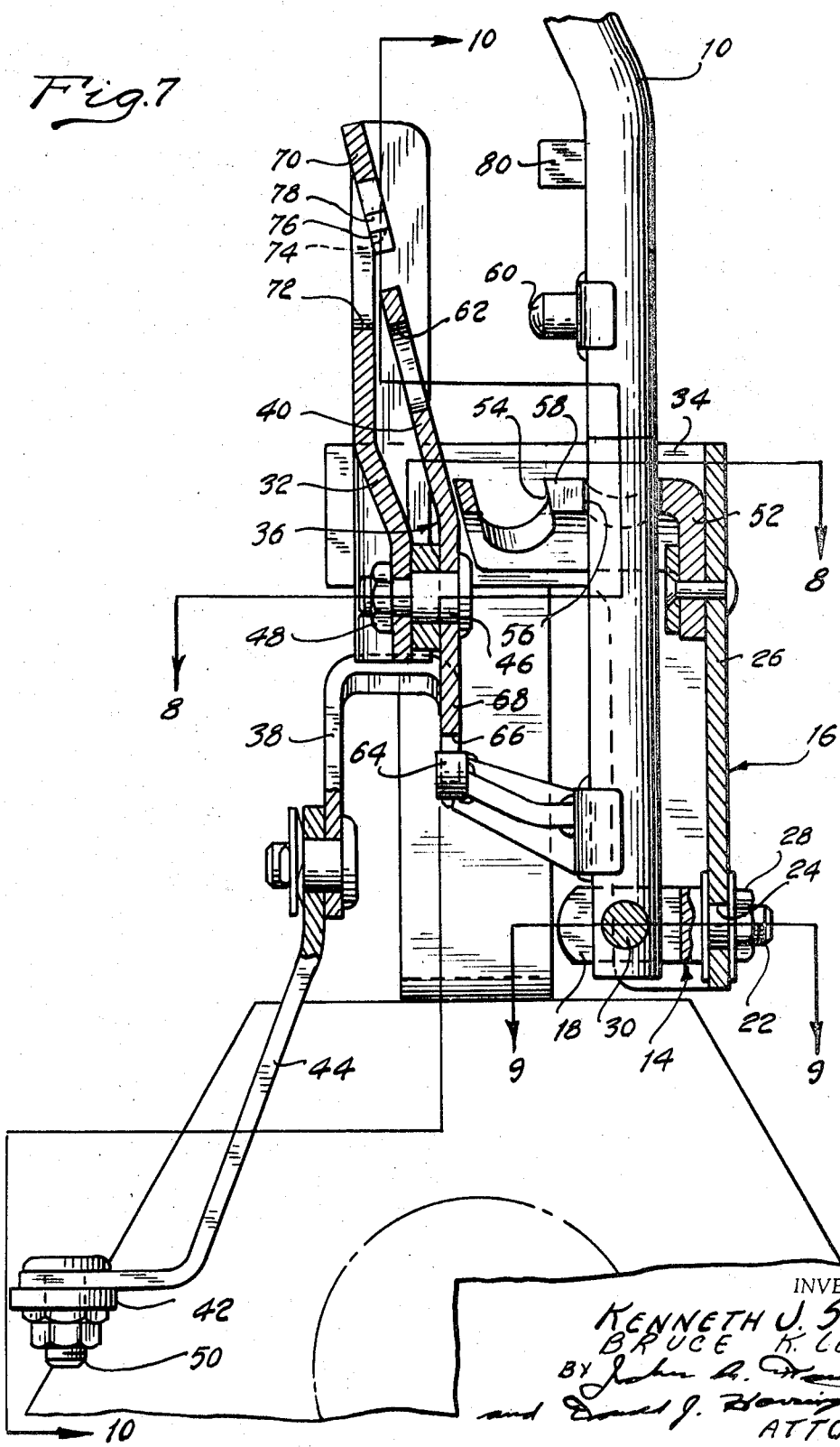
FIGURE 7 shows a cross sectional view of the lower end of the central assembly of FIGURES 1A and is located in the same plane as the plane of FIGURE 3.

The lower end of the gear shift lever 10 is joined by means of a universal pivot 14 to a bracket 16, as indicated in FIGURES 3 and 4. The universal pivot includes a yoke having spaced arms 18 and 20 and a stem 22 mounted rotatably within a bearing opening 24 formed in the side plate 26 of the bracket 16. The universal pivot is held in place by a retainer nut 28.

A mounting pin 30 is received through the base of the shift lever 10 and through the yoke arms 18 and 20. The bracket 16 includes a wall 32, which is spaced from wall 26. Walls 26 and 32 are joined by a wall 34.

Pivotally mounted on the wall 32 is a shift lever 36 having a depending portion 38 and an upstanding portion 40. Depending portion 38 is adapted to be connected to a transmission shift lever 42 by means of a mechanical linkage, such as that shown at 44. A manual valve for the automatic power transmission is mechanically connected to the transmission shift lever 42.

The lever 36 is pivoted on a pivot pin 46, which is secured to wall 32. Pin 46 is received through an opening formed in wall 32 and is held in place by a retainer nut 48. The end of the rod 44 is pivotally connected to the end of the shift lever 36 by means of a connecting bolt 50.

Secured to the bracket wall 26 is a guide plate 52, which is arranged generally perpendicular to the plane of the sides 26 and 34. It is formed with two gate openings 54 and 56, and shift lever 10 is adapted to be received through one or the other of these openings, as indicated best in FIGURES 1 and 2.

The openings 54 and 56 are joined by a crossover slot 58, so that the shift lever 10 can be maneuvered from one gate opening to the other.

When the lever 10 is positioned in the gate opening 54, a pawl 60 secured to an intermediate portion of the lever 10 is received within an elongated opening 62 formed in the upper extremity of the shift lever 36. As the operator moves the shift lever 10 from one end of the opening 54 to the other, the pawl 60 causes lever 36 to oscillate about the pivot pin 46. This then causes shifting movement of the shift rod 44 and the shift lever 42. When the lever 10 assumes the position shown in FIGURE 1, the shift lever 42 is moved to the low speed ratio position identified by numeral 1. The transmission at that time is conditioned for continuous operation in the low speed ratio range, and automatic upshifts are inhibited. When the shift lever 10 assumes the full line position shown in FIGURE 1, the transmission will be conditioned for park. The shift lever 42, in addition to operating the range selector valve of the automatic control system for the transmission, is connected mechanically through a brake linkage mechanism to a transmission parking brake which is actuated when the lever 42 assumes the full line position indicated in FIGURE 1.

When the shift lever 10 assumes a first position intermediate the number 1 position and the park position, the transmission will be conditioned for neutral. When it assumes the second position intermediate these two extreme positions, the transmission will be conditioned for reverse drive operation.

As the operator shifts from the neutral position to the number 1 position, the end of the opening 54 acts as a mechanical stop which precisely defines the correct position of the shift lever 42 and establishes the low speed ratio drive range.

The lower end of the shift lever 10 has secured thereto a second pawl 64 which is located above the axis of the stem 22 of the universal pivot 14. The end of the pawl is adapted to register with a pawl recess 66 formed in a lower portion 68 of the shift lever 36. When the shift lever 10 is pivoted about the axis of pin 30, it will pass through the crossover slot 58 and register with the opening 56. At that time the pawl 64 is brought into registry with the pawl opening 66. Upon subsequent movement of the shift lever 10 about the axis of stem 22, the shift lever 36 is caused to oscillate about the axis of pivot pin 46, but the direction of angular displacement of the shift lever 36 with respect to the shift lever 10 is reversed. Thus, a clockwise pivoting motion of the shift lever 10, when it is in opening 54, will produce a counterclockwise motion of the shift lever 42.

On the other hand when the shift lever 10 is registered with opening 56, pawl 64 engages opening 66 and becomes active while the pawl 60 becomes disengaged from opening 62 and is inactive. Thus the shift lever 10 is moved in a clockwise direction. The shift lever 42 also moves in a clockwise direction.

If the shift lever 10 is moved by the operator in a clockwise direction until it engages the end of opening 56, the shift lever 42 will be conditioned for intermediate speed ratio operation. Subsequently, if the shift lever 10 is shifted in a counterclockwise direction to the other end of the opening 56, the shift lever 42 will assume the number 3 position, which corresponds to the fully automatic drive range for the transmission. An upshift from the intermediate speed ratio to the high speed ratio then will occur if the automatic controls in the transmission valve system will allow such a shift to occur.

In operating this shift linkage mechanism, the operator normally would shift to the neutral position or to the park position before he cranks the vehicle engine. After the engine fires and is idling, the operator can shift from the neutral position to the low speed ratio position simply by moving the shift lever 10 against the stop defined by the opening 54. At that time the pawl 60 is active, and the shift lever 42 moves to the dotted line position shown in FIGURE 1. Acceleration then can occur from standing start in the low speed ratio range.

After the vehicle is moving, the operator can shift to the intermediate speed ratio position manually by advancing the shift lever 10 in a clockwise direction until an intermediate point is reached, as shown in FIGURE 1. The operator would exert a side load on the shift lever 10 so that the lever 10 will pass slightly beyond the intermediate point until it reaches the crossover position. The shift lever then immediately will shift over to the opening 56. Continuing motion of the shift lever 10 in the clockwise direction then can continue until the shift lever 10 engages the end of the opening 56 corresponding to the intermediate speed ratio stop position. When the shift lever 10 passes from the crossover position CO to the stop position of opening 56, the shift lever 42 returns to the same position that it assumed when the shift lever 10 was at the previously neutral intermediate point. The shift lever 42 in the associated manual range selector valve of the transmission has a sufficient degree of overlap so that the intermediate speed ratio drive condition is maintained as the shift lever 10 moves between positions corresponding to the intermediate point and the crossover position CO.

As mentioned previously, the motion characteristics of the linkage are reversed as the shift lever 10 moves from one gate opening 54 to the other gate opening 56.

Upon subsequent movement of the shift lever 10 in a counterclockwise direction, the shift lever 42 will continue to move in a counterclockwise direction until the automatic drive range number 3 is reached. At that time the shift lever 10 engages the mechanical stop defined by the end of the opening 56.

In order to assist the vehicle operator in the shifting pattern, we have provided a gate in the form of a plate 70, which is welded at one margin thereof to the upper surface of the guide plate 52. The plane of the plate 70 is generally parallel to the axis of the shift lever 10 when the shift lever 10 registers with opening 54.

The gate plate 70 comprises a series of mechanical stops formed on one side of an opening 72. The stops are identified by reference characters 74, 76 and 78. They are engaged by an interlock element 80, which projects through a slot 82 formed in the lever 10. An interlock spring 84 located in the hollow interior of the shift lever 10 normally urges the element 82 into engagement with the margin of the opening 72 in which the shoulders are formed. A push rod 85 extending through the shaft 10 terminates at the upper end of the shaft 10 with a push button 86. As the bottom 86 is depressed by the thumb of the vehicle operator, the push rod 85 will shift the element 80 against the force of spring 84, thereby removing the element 82 from interference with shoulders 74, 76 and 78.

The operator can shift the lever 10 in the opening 54 until element 80 engages shoulder 78. At that time the transmission is conditioned for neutral operation. When the operator moves the shift lever from the number 1 position to the neutral position, overtravel of the lever inadvertently into the reverse position is avoided by the shoulder 78. In a similar fashion, by depressing the push button 86, the operator may overrule the inhibiting action of shoulder 78, and he may shift the lever 10 until element 80 engages shoulder 76. At that time the transmission is conditioned for reverse drive operation.

The park position is established precisely as the element 80 moves to a position intermediate the shoulder 74 and the end of the opening 72. The lever 10 then is held in the park position until the vehicle operator chooses to remove it from that position by depressing the button 76 and shifting the lever 10 manually through the opening 54.

As the vehicle operator shifts the transmission manually, he can select the various drive ratios directly and conveniently. As he moves the shift lever 10 from one mechanical stop to the other, in advertent overtravel or undertravel of the shift lever 10 during a shift sequence cannot occur. As the shift lever follows the H motion pattern, the compound motion transmitting characteristic of the linkage mechanism makes it possible for the shift linkage in the manual range selector valve in the transmission to move linearly in a single direction from one drive range position to the other notwithstanding the fore- and aft-motion of the shift lever 10 during the shift sequence.

Having thus described a preferred form of our invention, what we claim and desire to secure by U.S. Letters Patent is:

1. A manually controlled linkage for controlling remotely the position of a control element comprising a first personally operable lever, a relatively stationary mounting bracket, a universal pivot connection between one end of said lever and said bracket, a guide plate situated in a plane transverse to the axis of said first lever, first and second guide openings formed in said plate, a crossover slot connecting said openings, said lever being adapted to register with said openings, a second lever pivoted for oscillation at a central portion thereof, a releasable pawl connection between said first lever and one end of said second lever, said pawl connection drivably engaging said first and second levers when said first lever registers with a first guide opening, the other end of said second lever being connected to said control element, and a second pawl carried by said first lever engagement with another portion of said second lever when said first lever registers with said second guide opening, said second pawl engaging said second lever at a location on one side of its axis of oscillation and said first pawl engaging said second lever on the opposite side of its axis of oscillation whereby the direction of relative motion of said control element with respect to said first lever upon movement of said first lever is reversed as said first lever shifts from one guide opening to the other, said crossover slot accommodating shifting movement of said first lever between said guide openings.

2. The combination as set forth in claim 1 wherein each end of each guide opening forms a mechanical stop for said first lever which precisely defines separate operating positions for said control element.

3. The combination as set forth in claim 2 wherein a first operating position of said control element corresponds to a position of said first lever when it engages one end of said first guide opening, a second operating position of said control element corresponding to a position of said first lever intermediate the crossover slot location and said one end of said first opening, said second operating position of said control element corresponding also to the position of said first lever when it engages one end of said second guide opening, a third operating position of said control element corresponding to the position of said first lever when it engages the other end of said second opening.

4. The combination as set forth in claim 1 wherein said control element has at least one additional operating position corresponding to a position of said first lever intermediate the two ends of said first opening when said first lever registers with said first opening, and interlock means comprising registering interlock elements carried by said first lever in said bracket for precisely establishing the position of said first element corresponding to said additional control element position.

5. The combination as set forth in claim 2 wherein said control element has at least one additional operating position corresponding to a position of said first lever intermediate the two ends of said first opening when said first lever registers with said first opening, and interlock means comprising registering interlock elements carried by said first lever in said bracket for precisely establishing the position of said first element corresponding to said additional control element position.

6. The combination as set forth in claim 3 wherein said control element has at least one additional operating position corresponding to a position of said first lever intermediate the two ends of said first opening when said first lever registers with said first opening, and interlock means comprising registering interlock elements carried by said first lever in said bracket for precisely establishing the position of said first element corresponding to said additional control element position.

References Cited

UNITED STATES PATENTS

| | | | |
|---|---|---|---|
| 3,250,145 | 5/1966 | Harper | 74—473 |
| 3,364,779 | 1/1968 | Cambria | 74—473 |

MILTON KAUFMAN, Primary Examiner

U.S. Cl. X.R.

74—565